Sept. 7, 1965 R. M. WHITE 3,205,399

SLOW WAVE TRANSMISSION LINE

Original Filed May 15, 1961 4 Sheets-Sheet 1

RICHARD M. WHITE
INVENTOR.

BY Urban H. Faubion

ATTORNEY

Sept. 7, 1965 R. M. WHITE 3,205,399

SLOW WAVE TRANSMISSION LINE

Original Filed May 15, 1961 4 Sheets-Sheet 2

RICHARD M. WHITE
INVENTOR
BY Urban H. Faubion
ATTORNEY

SLOW WAVE TRANSMISSION LINE

Original Filed May 15, 1961

4 Sheets-Sheet 3

RICHARD M. WHITE
INVENTOR.

BY Urban H. Faubion

ATTORNEY

Sept. 7, 1965 R. M. WHITE 3,205,399

SLOW WAVE TRANSMISSION LINE

Original Filed May 15, 1961 4 Sheets-Sheet 4

RICHARD M. WHITE
INVENTOR.

BY Urban H. Faubion

ATTORNEY 3,205,399

SLOW WAVE TRANSMISSION LINE

Richard M. White, Los Altos, Calif., assignor to General Electric Company, a corporation of New York Original application May 15, 1961, Ser. No. 110,209. Divided and this application Mar. 18, 1963, Ser. No. 272,177
6 Claims. (Cl. 315—3.5)

The instant application is a divisional application of S.N. 110,209, filed May 15, 1961, now U.S. Patent No. 3,126,497, issued March 24, 1964.

This invention relates to the class of devices which depend upon an interchange of energy between a stream of electrons and a radio frequency field to provide amplification and/or oscillations. More particularly, the invention relates to the class of high frequency energy interchange devices known as traveling wave tubes which include an electron gun for producing a stream of electrons in an interaction region and a radio frequency circuit or transmission line for producing radio frequency fields in the region of interaction, and the invention has for one of its principal objects the provision of improved radio frequency circuits for use in such devices.

Probably the most common slow wave transmission line or circuit for producing radio frequency fields in the interaction region of a traveling wave tube is a helix. The helix is carefully designed to have the proper pitch and diameter to generate or to amplify electromagnetic waves in the frequency range of interest. This circuit is a very practical circuit when generating or amplifying waves which are longer than, for instance, several centimeters wavelength and it would be a possible structure for amplifying even shorter wavelengths if it were not for the difficulty of physically realizing helix structures which are small enough for millimeter waves. A helix of optimum size for operation at a five millimeter wavelength, for example, has a diameter of the order of that of a human hair and the individual turns are almost impossible to discern by the normal unaided human eye. Consequently such a structure is extremely difficult to make with the accuracy required and its power dissipation capability is so small that it is useless for producing or amplifying any large amount of power.

In order to be constructed practically circuits for millimeter and submillimeter wave devices should be relatively large and in order to utilize electron streams with large powers at practical power densities the circuits should present large cross sectional areas of useful electric field to the stream. A circuit which meets the first requirement is a circuit known as a ladder. The circuit is so named because in its basic form it is simply a series of slots cut in a conductive plane which may be infinite in extent. Thus a series of parallel rungs are formed between slots which extend between two parallel longitudinal lateral members. The length of the rungs is on the order of half the operating wavelength for the frequency of interest. Improved ladder type circuits and tubes which utilize such circuits are considered here.

The need to increase the cross sectional area of the circuit and the useful electric fields has been met by paralleling the ladders essentially side by side, that is, placing the ladders in parallel planes in such a manner that the electric field from the ladders support each other and directing electron streams between and outside the ladder structures.

In accordance with the present invention single ladder slow wave circuits of basically simple construction are provided to give fundamental forward and backward wave interaction behavior with electron streams which are directed in coupling relation to the electric fields existing in the vicinity of the series of regularly spaced discontinuities of the ladder circuits. Fundamental forward or backward wave behavior is obtained by altering the magnetic and/or electric coupling from slot to slot. Other circuits of this general character are illustrated, described, and claimed in two co-pending applications filed the same date as the present application, given the same title and assigned to the same assignee. One of the applications, S.N. 110,210, is filed in the name of Charles K. Birdsall, Richard W. Grow, and Richard M. White, now abandoned, and the other, S.N. 110,212, is filed in the name of Charles K. Birdsall and Richard W. Grow. The circuits are particularly well suited for use in a stacked array to form multiple parallel ladders with tight electrical coupling obtained by stacking the ladders close together to obtain the unexpected support of electric fields between ladders described and claimed in the Birdsall, Grow, and White application.

The novel features which are believed to be characteristic of the invention are set forth in more particularity in the appended claims. The invention itself, however, both as to its organization and method of operation, together with further objects and advantages thereof, may best be understood by reference to the following description taken in connection with the accompanying drawings in which:

Figures 1, 2:
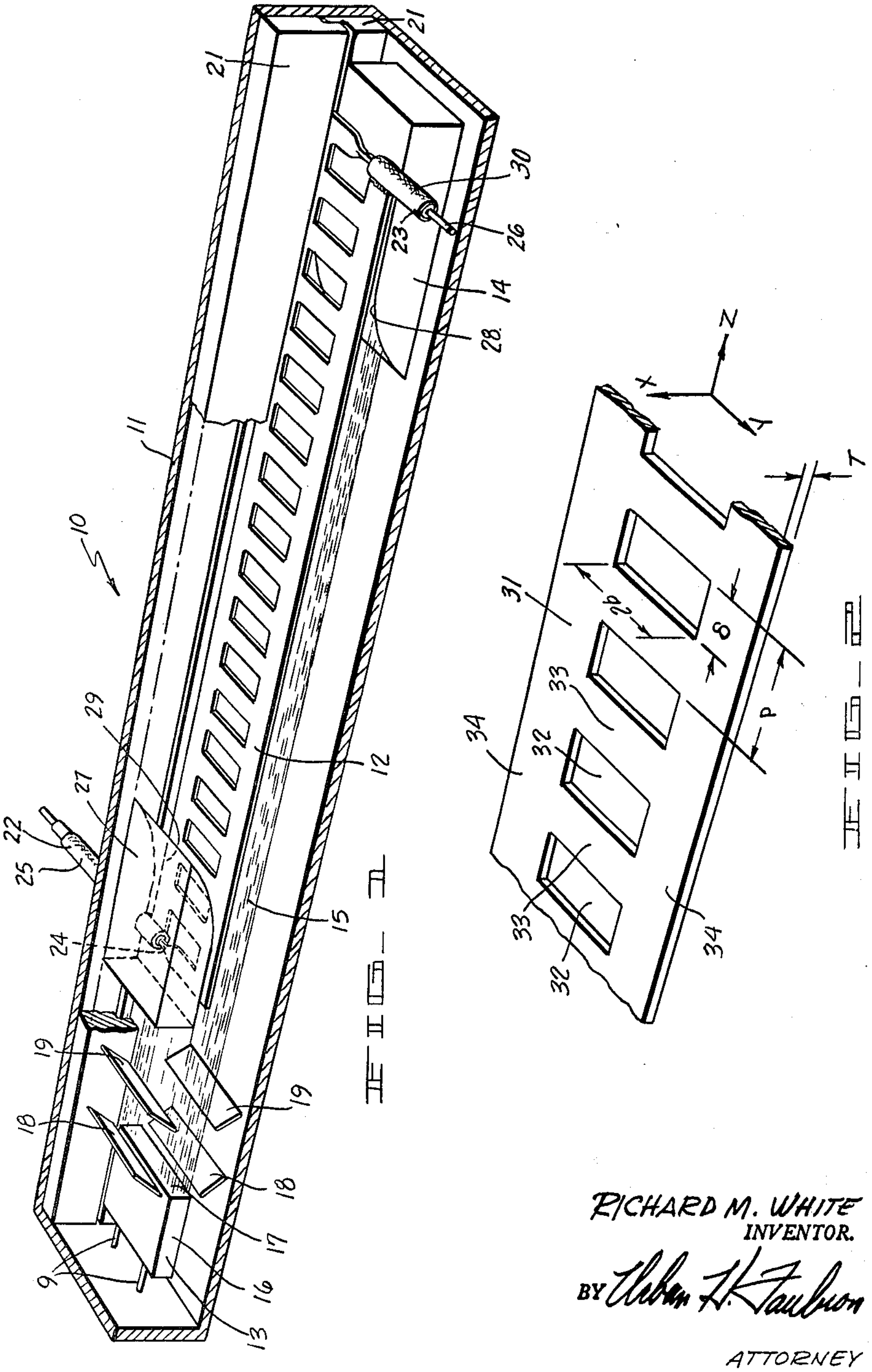
FIGURE 1 is a partially broken away perspective view of an energy interchange device which employs a ladder circuit.
FIGURE 2 is a perspective view illustrating a simple ladder structure along with the coordinate system and symbols used in the description of all of the figures.

FIGURE 1 illustrates a linear sheet stream type high frequency energy interchange device 10 of the traveling wave type which employs a ladder type slow wave circuit 12. The device 10 includes an enclosed and evacuated envelope 11 having a rectangular cross section. Envelope 11 encloses the ladder type transmission line 12, a sheet stream producing electron gun 13 at one end, and an impedance matching and electron-collecting member 14 at the opposite end of the device. The electron gun 13 produces and directs a sheet-like stream of electrons 15 down the length of the envelope 11 beneath and in close proximity to the ladder type slow wave circuit 12 and the electrons are collected at the opposite end of the device on the collector and matching member 14. The electron stream 15 and the electromagnetic waves propagated down the ladder type slow wave circuit 12 interact to produce amplification. The configuration of the ladder circuit is described in detail in connection with FIGURE 2.

The electron gun 13 is illustrated rather diagrammatically since it is a conventional gun for producing rectilinear electron flow. The gun includes a cathode member 16 with an electron emissive surface 17, two pairs of electron focusing and directing electrodes 18 and 19, respectively, and heater elements which are not shown. Each of the pairs of electron focusing and directing electrodes 18 and 19 includes two substantially planar, rectangular conductive plates spaced far enough apart to allow the rectilinear stream of electrons 15 to pass between them and sloped to insure that the electron accelerating and directing electric fields therebetween have the desired configuration. The design considerations for a gun of the type illustrated are discussed in the book entitled "Theory and Design of Electron Beams" 2nd edition by J. H. Pierce, Van Nostrand Company, Inc., New York (1954) in section 10.1 at page 174 et seq. The particular type gun illustrated is shown in the Pierce book in Figure 10.5 on page 178. Leads 9 are brought in through the outer end wall of the device to energize the gun electrodes. Only two such leads are illustrated, but other leads are normally provided to establish electrode potentials. A magnetic focusing field is also provided to focus the electron stream 15. This is typically provided by a solenoid (not shown) external to the device.

The substantially planar ladder type slow wave circuit 12 is suspended with its plane generally horizontal and parallel to the plane of the sheet electron stream 15 by means of insulating supporting strips which extend down the full length of the energy interchange device 10. A pair of insulating strips 21 is provided along each side of the device; however, it is not convenient to illustrate both pairs of strips. The strips are all identical, are generally L-shaped in cross section and are arranged in the same general manner on opposite sides of the device. The pair of slow wave circuit supporting insulating strips 21 are arranged along one side wall of the envelope 11 in such a manner that the legs of the L's mate to support one edge of the slow wave circuit 12.

The particular device illustrated operates as a forward wave amplifier. As a consequence the radio frequency energy is introduced onto the slow wave circuit 12 by means of a coaxial transmission line 22 at the gun end of the device and the amplified radio frequency energy is abstracted by means of the coaxial transmission line 23 at the collector end. The input coaxial transmission line 22 includes a center conductor 24 which is connected to the input end of the slow wave transmission line and an outer conductive sheath 25 which is brought into the energy interchange device and connected to an input impedance matching conductive member 27. In a corresponding fashion, the output coaxial conductor 23 includes an inner conductor 26 which is connected directly to the slow wave transmission line 12 at its output end and an outer conductive sheath 30 which is connected to the output impedance matching and collector member 14.

Impedance matching members 14 and 27 are of substantially identical geometrical configuration although as illustrated, the size of the two members may differ. The portion of the members which accomplishes the matching function is the conductive surfaces 28 and 29 respectively, which are best described as having generally parabolic shapes when viewed from the side. The shape is not necessarily derived from any known geometrical figure but is designed to give the desired transition in impedance between the transmission lines under consideration. The proper impedance match is accomplished between the coaxial transmission line 22 at the gun end of the tube by positioning the matching member 27 in such a manner that its conductive surface is near the gun end and slopes away from the circuit.

Conversely, the conductive surface 28 of the collector impedance match member 14 is relatively far from the slow wave circuit 12 at the end where it collects electrons and is very near the slow wave circuit near the coaxial transmission line 23. Thus, the electron stream 15 is collected on the front portion of the collector 14 where the collector has little effect on the impedance of the slow wave circuit 12.

Both of the matching members 14 and 27 are illustrated as solid members. This is done because it is a simple construction and such members can easily be brazed to the walls of the envelope 11. However, the matching members may be made hollow to provide for coolant or of any other desired construction.

The impedance matching arrangement does not form a part of the same invention but is described and claimed in United States Patent 2,962,620, November 29, 1960, issued in the name of Ward A. Harman and assigned to the assignee of the present invention.

The slotted plane ladder slow wave circuit 12 utilized in the traveling wave tube of FIGURE 1 is illustrated in more detail in FIGURE 2. This circuit may be considered the basic ladder circuit. The circuit is composed of a single planar conductive member 31 with a series of rectangular slots 32 disposed at regular intervals down its length. The slots 32 thus define a series of ladder rungs 33 down the length of the circuit and planar side pieces 34 which resemble the uprights of an ordinary ladder.

In order to facilitate discussion of the ladder circuit a three dimensional coordinate system is given in FIGURE 2 by three arrows $x$, $y$, and $z$. The $z$ direction is along the length of the ladder circuit, the $x$ direction is perpendicular to the plane of the ladder circuit and the $y$ direction is transverse to the length of the ladder circuit and in the plane thereof. The thickness of the ladder is indicated by the letter T and the length of each of the ladder rungs is $2b$. The ladder pitch, that is, the distance between corresponding points on adjacent rungs is indicated by the letter P and the width of the ladder slot is given by the Greek letter $\delta$. Waves propagate along the ladder, with electromagnetic energy progressing from slot to slot. There is no need for a nearby second conductor nor a complete enclosure. Electric field lines are directed from one rung to another, very close to the plane of the ladder, decaying exponentially away from the plane and varying sinusoidally from one end of the slot to the other. The radio frequency currents flow along the rungs and around the ends of the slots.

The nature of the waves is sensitive to the relative shape and size of the rungs and slots. All field quantities depend on $z$ (distance down the circuit) and $t$ (time) as the exponential $$[j(\omega t-\beta z)]$$

where $$\omega=2\pi \text{ (frequency)}$$

and $$\beta=\text{a phase constant}$$

Figure 3:
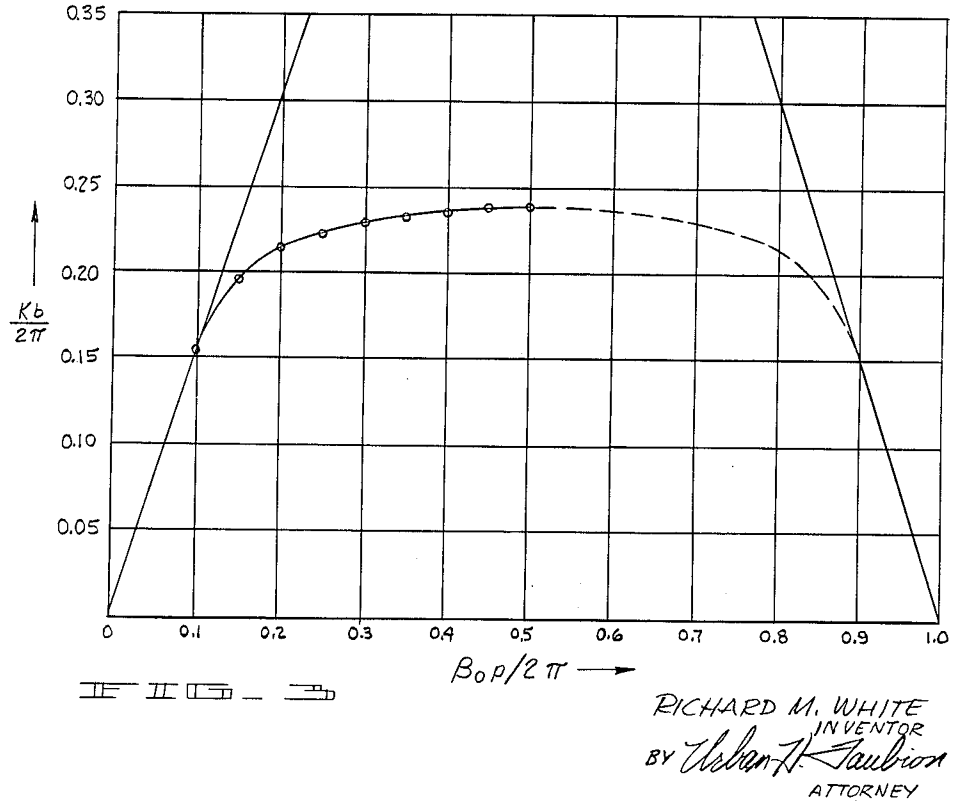
FIGURE 3 is an $\omega$-$\beta$ diagram for the plane ladder of FIGURE 2 and illustrates characteristics of the ladder circuit which are described in detail below.

The velocity characteristic will be given in terms of the familiar $\omega$-$\beta$ diagrams in which the phase velocity $$(V_p)=\omega/\beta$$

and the group velocity $$v_g=1/\frac{\gamma\beta}{\gamma\omega}$$

as usual, $k=\omega/c$ (when $c$ is the velocity of light). The $\omega$-$\beta$ diagram for the simple ladder of FIGURE 2 is shown in FIGURE 3. At very low frequencies the circuit propagates with group and phase velocities both equal to the velocity of light and at nearly zero impedance; as the frequency for slot resonance is approached the group velocity tends toward zero and the impedance approaches infinity. This frequency depends on the shape of the slot and, for rectangular slots, corresponds to a slot length of about a half free-space wavelength, or $kb=\pi/2$.

As with all axially periodic structures, a set of spatial harmonics with phase constants $$\beta_n=\beta_0 \quad 2\pi n/p \quad n=0, \pm 1, \pm 2$$

is required to meet the boundary conditions. In FIGURE 3 the $n=0$ component is shown with a continuous line, the $n=-1$ component, a dashed line. Propagation is allowed only in certain well defined regions and is forbidden outside, in order that the energy required be finite. Near the slots, the fields may be assumed to vary with $x$ and $y$ as $$\exp.\ (K_x x)\ \cos\ (k_y y)$$

where $$\beta^2=K-k_y^2$$

In order that the fields decay away from the plane it is necessary that $K_x^2 \geqslant 0$.

The boundary of the region where this inequality is valid is given by the equality $$\beta^2=-k_y^2$$

It might appear from this equation that some propagation at a phase velocity greater than $c$ could occur; however, the set of required wave numbers, $k_y$, includes the value zero for the plane extending to infinity in the $y$ direction so that the boundary is $$\beta=\pm k$$

One also arrives at this same answer by considering the fields far from the structure; there the fields must vary as $$K_1(\gamma r) \text{ where } \gamma^2=2-k^2,\ r^2=x^2+y^2$$

then it is readily seen that to have the fields decay as $r$ 00 forces $\gamma^2 \geqslant 0$, leading to the same answer as above. Note that the boundary equation applies to all the spatial harmonics as well as to the fundamental.

The simple ladder is one of the charter members of the class of so-called "open circuits," and shares the same forbidden and propagating regions. Experimental evidence of the field behavior in $x$ and $y$ to be given later supports the assumption given above; all of the circuits tested appear to operate only in propagating regions.

The interaction impedance of interest is the voltage-power impedance measured along the path to be followed by the electron stream, and is generally given by $$K_n=E^2zn/2B^2nP$$

Figure 4:
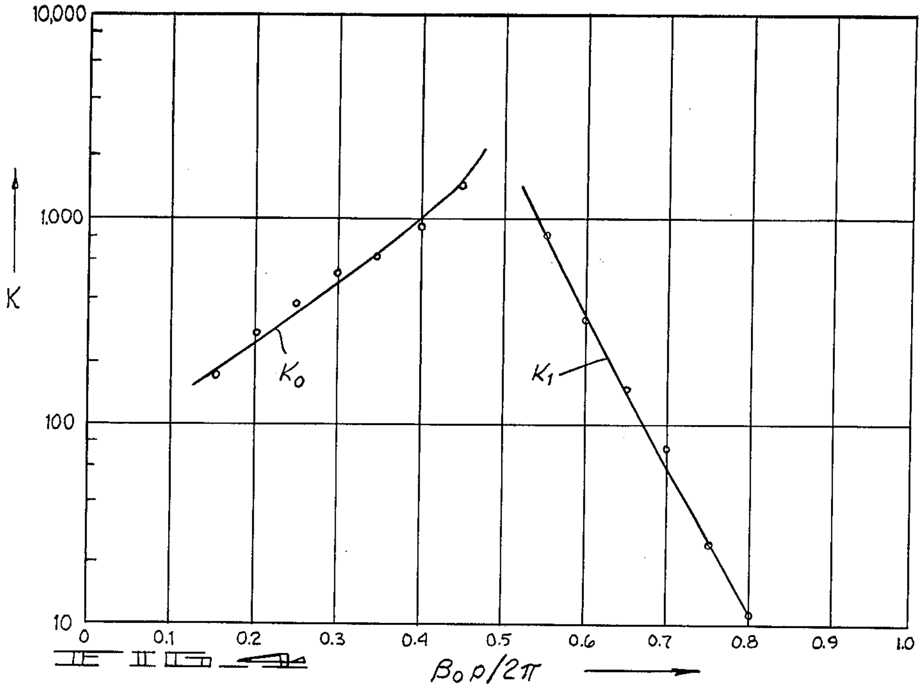
FIGURE 4 is a graph illustrating the interaction impedance of the circuit of FIGURE 2.

One path amenable to accurate measurement, although not the usual path for the stream, is at the very center of the ladder rungs; along this path the impedance will probably be higher than at the edge of the rungs, most certainly higher than the impedance averaged over the area occupied by the electron stream(s). For the ladder used for FIGURE 3, the impedance measured on this path is shown in FIGURE 4 for the $n=0$ and $n=-1$. The values were obtained by perturbing the longitudinal electric field $E_z$ with a small diameter dielectric rod inserted through a small hole in the center of the rungs and the $z$ axis.

The relatively large values of interaction impedance $K_n$ constitute the major (electrical) attraction to using the ladder. To be sure, the resonance and vanishing group velocity are contributing causes. Any circuit which can be made to have a resonance can have a pole in its impedance variations; the unadorned ladder, with its simple field structure has most of its stored energy W in $E_{z0}$ and $E_z-1$ so that the large values of $K_n$ are not due solely to the resonance. This last observation is most important when considering the impedance to be found with variations of the basic ladder circuit; unfortunately, although velocity has been measured for many variations, impedance has not. A detailed analysis of the interaction impedance, the effect of the thickness T of the ladder and the effect of pitch is given in a paper published by the inventor in Proceedings of the Symposium of Millimeter Waves, Polytechnic Press of the Polytechnic Institute, Brooklyn, New York, page 367ff, 1960.

The transmission properties of the ladder circuit depend on the radio frequency coupling of one slot to the next. The coupling is determined by the configuration of the rungs themselves or by additional loading placed near or on the ladder. These circuits may be called "loaded" ladder circuits. Loading of the ladder may alter markedly the propagation characteristics of the plane ladder, making possible the design of circuits having band pass or other characteristics which may make them more suitable for electron stream interaction. A number of these special circuits along with their use in traveling wave tubes is discussed here.

Coupling is of two types: Magnetic (or inductive) coupling which has its origin in the interaction of current and magnetic fields associated with the separate rungs and electric (or capacitive) coupling due to the interaction of surface charges in electric fields on separate rungs. The magnetic fields and conducting current are strongest at the roots of the rungs. Loading at the roots (outer ends of the rungs) will then be expected to alter mainly the magnetic coupling; this loading in its simplest form uses conducting planes normal or at an angle to the ladder planes. The electric field and surface charges are strongest at the center of the rung so that changing capacitance at near the center of rungs alters mainly the electric coupling.

Figure 5:
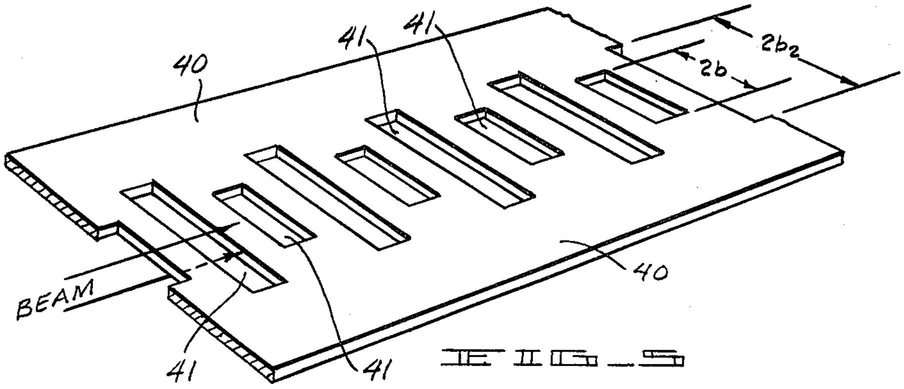
FIGURE 5 is a perspective view of a part of a ladder circuit which utilizes slots of different lengths to provide a desirable characteristic.
Figure 6:
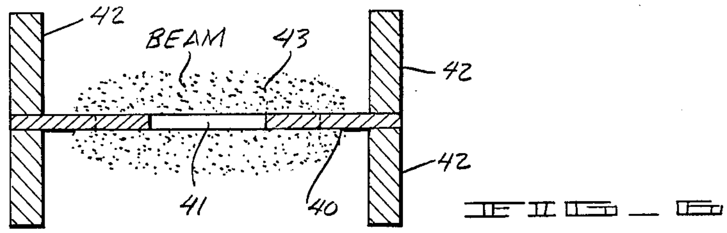
FIGURE 6 is an end view of the circuit of FIGURE 5 with normal and spaced shorting planes.

The resonant frequencies of successive ladder slots may be varied in a regular manner in order to provide $\omega$-$\beta$ characteristics in impedance characteristics which are desirable for certain applications. This may be done by varying the slot loading in a regular manner. One form of this circuit is illustrated in FIGURES 5 and 6. In this embodiment the circuit is composed of the single conductive plate 40 with the width of the slots 41 varied so that alternate slots have the width $2b$ and the intermediate slots have the width $2b_2$, the distance between successive slots being equal. In other words, the narrowest part of the width of the rungs is constant (all equal). One could consider that this structure is composed of two ladders of different slot widths interleaved and made co-planar. The position of the electron stream 43 relative to the circuit 41 may be seen in FIGURE 6.

Figure 7:
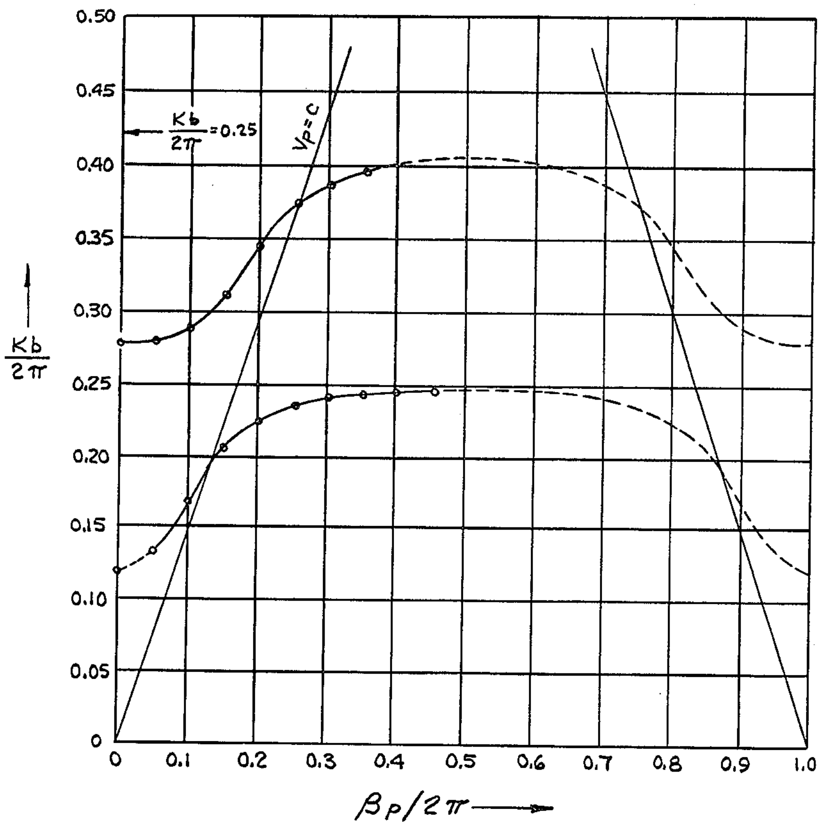
FIGURE 7 is a conventional $\omega$-$\beta$ diagram illustrating the characteristics of the ladder circuit of FIGURES 5 and 6.

The resultant circuit has two lowest order modes corresponding to the rung resonance of frequencies as shown in the $\omega$-$\beta$ curves of FIGURE 7. (This curve was taken with the ladder enclosed in a rectangular waveguide having a width $1/2b_2=2.1$, with a calculated cut-off frequency at $Kb2/2\pi=0.119$.) The conductive side plates 42 are shown in the illustration of FIGURE 6. The upper branch of the curve corresponds to propagation by the narrower slots loaded by the wider slots which are above resonance and which provide added capacitive coupling. The lower branch is associated with the wider slots which are loaded, inductively, by the narrower slots which are below resonance.

By placing conducting side plates 42 at the ends of the longer slots a lower branch is eliminated, for the guide cut-off frequency is at or just above the lower branch resonance frequency. It is found that the remaining (upper) branch was much as shown here; the phase velocity greater than the velocity of light points were at higher frequencies following the characteristic of a waveguide with a higher cut-off frequency. An interesting feature of the circuit is that both fundamental forward and backward wave upper branches are available.

Figure 8:
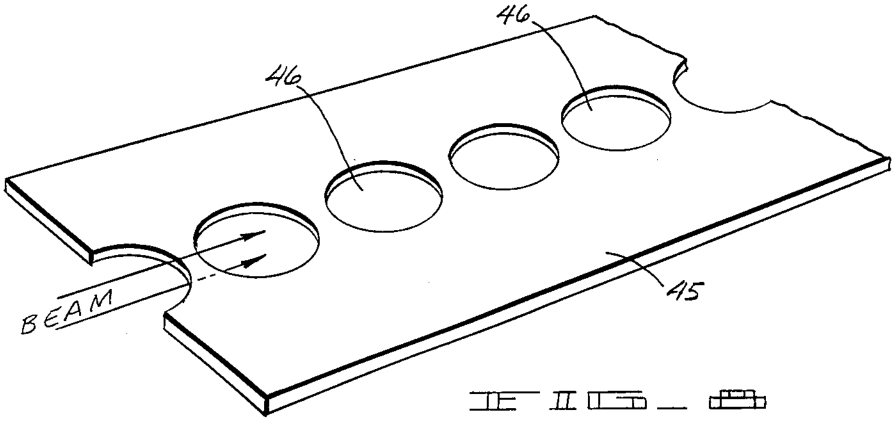
FIGURE 8 is a ladder circuit in which the slots in the ladder are rounded.
Figure 9:
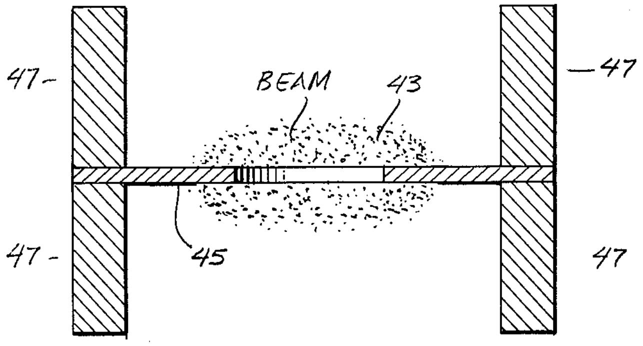
FIGURE 9 is an end view of the ladder circuit of FIGURE 8 with normal and spaced shorting planes.

Another circuit configuration which has usefulness for specific applications is illustrated in FIGURES 8 and 9. This ladder consists of a planar conductive member 45 and substantially circular slots 46. This configuration is attractive from the standpoint that it is perhaps the easiest to realize mechanically but the circuit should be used with conductive side plates 47 as illustrated in FIGURE 9 or in an enclosed waveguide.

Rounding the ends of the slots does not cause a significant change in velocity. Useful results may be achieved without rounding the slots to the extent illustrated.

Production of large amounts of power at millimeter wavelengths using slow wave interaction may be realized by proper use of the circuits described. A requisite for useful paralleling of ladder circuits is that the separate circuits be tightly enough coupled to force phase synchronism among the wave traveling along the circuit so that the circuit, inside, behaves as a simple circuit. This procedure is discussed in the co-pending application of Birdsall, Grow, and White, supra. The circuits discussed above are quite useful for paralleling by the procedure discussed.

While particular embodiments of the invention have been shown it will, of course, be understood that the invention is not limited thereto since many modifications both in the circuit arrangements and instrumentalities employed may be made. It is contemplated by the appended claims to cover any such modifications as fall within the true spirit and scope of the invention.

What I claim is new and desire to secure by Letters Patent of the United States is:

1. In combination in a high frequency energy interchange device, an evacuated envelope, a slow wave transmission line positioned within said envelope, an electron stream producing means for producing a stream of electrons in the axial direction in close proximity to said transmission line, input and output fast wave transmission lines connected to said slow wave transmission line to introduce radio frequency energy thereon and abstract radio frequency energy therefrom, respectively, said slow wave transmission line including at least one substantially planar conductive member said conductive member comprising conducting side pieces extending down its length and conductive rungs joining said side pieces at recurring intervals, the configuration of said rungs and side pieces being defined by a first and a second set of slots having their centers in a common longitudinal line, said first set of slots being all alike, and said second set of slots being all alike but different from said first set of slots.

2. A high frequency energy interchange device including an evacuated envelope, a slow wave transmission line positioned within said envelope along the length thereof, an electron stream producing means positioned at one end of said evacuated envelope for producing a sheet stream of electrons in the axial direction within said evacuated envelope and in close proximity to said slow wave transmission line, input and output fast wave transmission lines connected to said slow wave transmission line to introduce radio frequency energy thereon and abstract radio frequency energy therefrom respectively, sail slow wave transmission line including at least one substantially planar conductive member said conductive member comprising conducting side pieces extending down its length and conductive rungs joining said side pieces at recurring intervals, the configuration of said rungs and side pieces being defined by a first and a second set of slots having their centers in a common longitudinal line, said first set of slots being rectangular and all alike, and said second set of slots being all alike and rectangular but of a different size from said first set.

3. In a high frequency energy interchange device of the type which depends upon the interaction of an electron stream produced by an electron gun with electromagnetic waves propagated down a slow wave transmission line in close proximity to the electron stream, said slow wave transmission line including at least one substantially planar conductive member, said conductive member comprising conducting side pieces extending down its length and conductive rungs joining said side pieces at recurring intervals, the configuration of said rungs and side pieces being defined by a first and a second set of slots having their centers in a common longitudinal line, said first set of slots being all alike, and said second set of slots being all alike but different from said first set of slots.

4. In a high frequency energy interchange device of the type which depends upon the interaction of an electron stream produced by an electron gun with electromagnetic waves propagated down a slow wave transmission line in close proximity to the electron stream, said slow wave transmission line including at least one substantially planar conductive member said conductive member comprising conducting side pieces extending down its length and conductive rungs joining said side pieces at recurring intervals, the configuration of said rungs and side pieces being defined by a first and a second set of slots having their centers in a common longitudinal line, said first set of slots being rectangular and all alike, and said second set of slots being all alike and rectangular but of a different size from said first set.

5. A high frequency circuit comprising a slow wave transmission line, said line including at least one substantially planar conductive member, said conductive member comprising conducting side pieces extending down its length and conductive rungs joining said side pieces at recurring intervals, the configuration of said rungs and side pieces being defined by a first and a second set of slots having their centers in a common longitudinal line, said first set of slots being all alike, said second set of slots being all alike but different from said first set, an input fast wave transmission line connected to said slow wave transmission line near one thereof to introduce radio frequency energy onto said slow wave line, and an output fast wave transmission line connected to said slow wave transmission line near the other end thereof to abstract radio frequency energy from said slow wave line.

6. A high frequency circuit comprising a slow wave transmission line, said line including at least one substantially planar conductive member, said conductive member comprising conducting side pieces extending down its length and conductive rungs joining said side pieces at recurring intervals, the configuration of said rungs and side pieces being defined by a first and a second set of slots having their centers in a common longitudinal line, said first set of slots being rectangular and all alike, said second set of slots being rectangular and all alike but of a different size from said first set, an input fast wave transmission line connected to said slow wave transmission line near one end thereof to introduce radio frequency energy onto said slow wave line, and an output fast wave transmission line connected to said slow wave transmission line near the other end thereof to abstract radio frequency energy from said slow wave line.

No references cited.

GEORGE N. WESTBY, *Primary Examiner.*